(No Model.)
W. H. RODGERS.
LOW WATER INDICATOR FOR BOILERS.
No. 492,236. Patented Feb. 21, 1893.
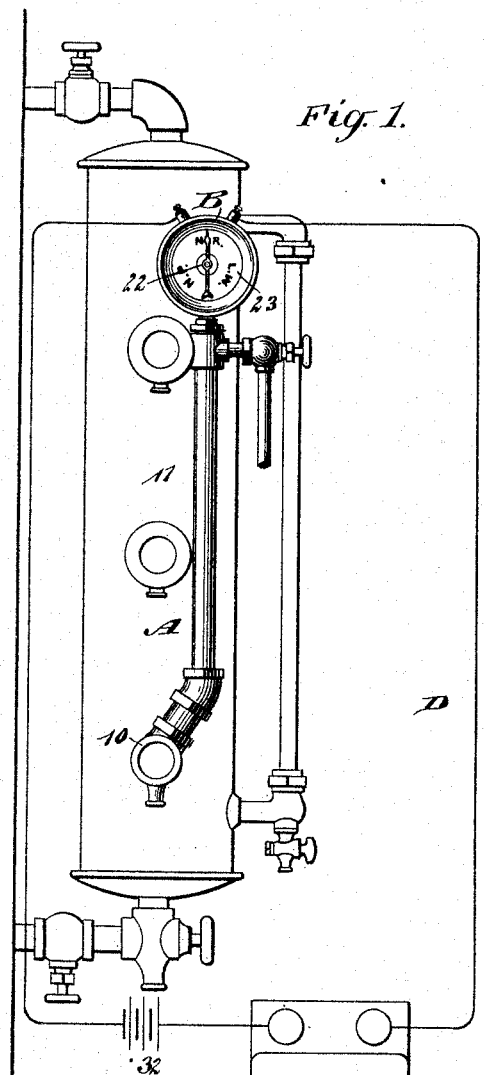
Fig. 1.
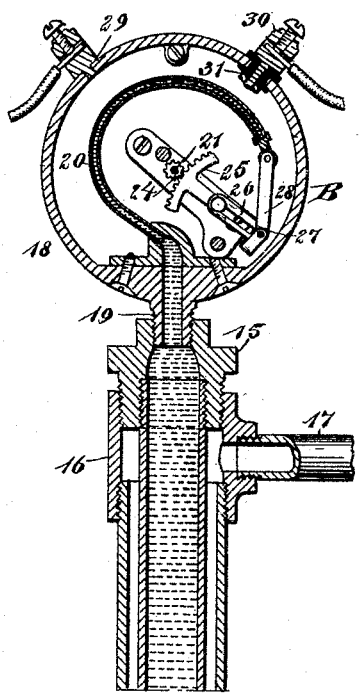
Fig. 2.
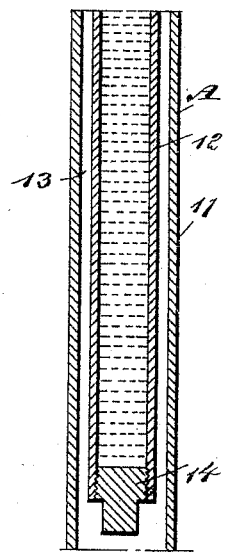
Fig. 3.
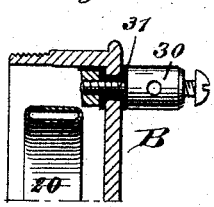
WITNESSES:
J. A. Criswell
C. Sedgwick
INVENTOR
W. H. Rodgers
BY Munn & Co
ATTORNEYS.
THE NORRIS PETERS CO., PHOTO-LITHO., WASHINGTON, D. C.

UNITED STATES PATENT OFFICE.

WILLIAM HENRY RODGERS, OF BAY SIDE, NEW YORK, ASSIGNOR OF ONE-HALF TO A. O. LARKINS, OF PORTSMOUTH, NEW HAMPSHIRE.

LOW-WATER INDICATOR FOR BOILERS.

SPECIFICATION forming part of Letters Patent No. 492,236, dated February 21, 1893.

Application filed June 24, 1892. Serial No. 437,896. (No model.)

*To all whom it may concern:*

Be it known that I, WILLIAM HENRY RODGERS, of Bay Side, in the county of Queens and State of New York, have invented a new and useful Improvement in Low-Water Indicators for Boilers, of which the following is a full, clear, and exact description.

My invention relates to an indicator for low water in boilers, and has particularly for its object to provide a device of the thermostatic order which will indicate upon a dial connected with it the height of the water within the boiler, and to provide an improvement upon the construction of the low water indicator for which an application for Letters Patent was filed by myself, May 21, 1892, Serial No. 433,848, the improvement in the construction being especially to reduce the cost of manufacture, and to simplify the device in various particulars.

A further object of the invention is to provide a low water indicator which will be capable of electrically producing an alarm.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a front elevation of the device, illustrating it as applied to a boiler; Fig. 2 is a central vertical section through the device; and Fig. 3 is a partial vertical section through the gage, illustrating the binding post located in a different position from that shown in Fig. 2.

The device is to be attached to the lower gage cock 10, or the intermediate, or the upper gage cock according to the predetermined water level to be established in the boiler.

The device consists of a body portion A and an indicator section B. The body portion A, consists primarily of an outer tube 11, which is in direct communication with the projected tube sustaining the lower gage cock, this connection being indicated in the drawings. Within the tube 11 a second tube 12, is located, of much smaller diameter than the first named tube, the diameter of the two tubes being such that a chamber 13, is formed between them. The inner tube extends upward some distance above the outer one, and the lower end of the inner tube is closed by a plug 14. The upper end of the inner tube has attached thereto in any approved manner a bushing 15, and the bushing and the outer tube are connected by a T 16, or the equivalent thereof, the bushing being preferably screwed upon the inner tube and the T screwed upon the bushing and outer tube, and the T 16, is ordinarily provided with a tap in one side, in which a valved drip pipe 17, is introduced, and the said drip pipe may lead to the ash pan of the boiler, or to any other desired point.

The indicator section of the device is in the nature of a gage, and comprises a casing 18, provided with a shank 19, the said shank being screwed into the upper end of the bushing 15, and is thereby brought into communication with the inner tube 12, as the shank 19 is tubular, an aperture extending through it from top to bottom, that is, from the outer to the inner side of the casing; and at the upper end of the aperture in the shank 19, the lower end of a segmental flattened tube 20 is located, the tube surrounding the aperture and being thereby brought into direct communication with the inner tube of the body.

The segmental tube will straighten out when the pressure increases in the inner tube 12. The upper end of the tube is closed, and both the segmental bent tube 20 and the inner tube 12 of the body are filled with an expansible liquid, such as alcohol, oil, &c.

A pinion 21, is pivoted within the casing, and is encircled by the flattened and bent tube. The outer end of this pinion is shaped as a post, and is adapted to receive a hand 22, as shown in Fig. 1; and the pinion passes through a dial 23, which is preferably divided into three sections, one section being designated as "normal," another as "low pressure," and a third as "no pressure," the hand pointing ordinarily to the normal section. The pinion 21 is engaged by a rack 25, the rack being pivoted upon a stud 26, secured in the casing, as shown in Fig. 2. The shank of the rack, by means of which it is pivoted, has connected therewith a link 27, which link is slotted to admit of the pivot of the rack passing through it, and to the outer end of the link a connecting rod 28, is pivotally secured at one end, the opposite end of the connecting rod being attached to the upper end of the flattened tube.

In order that an electrical connection may be effected when the bent or flattened tube commences to straighten outwardly, a binding post 29, is attached to the casing, having a metallic connection with it, and a second binding post 30, is insulated from the casing, but is provided with an interior contact 31, adapted for engagement with the bent tube. Thus two binding posts are in wire circuit with the battery 32, the circuit being designated by the letter D, and within the circuit a bell 33 of any approved construction is illustrated as being placed.

In Fig. 1, I have illustrated a binding post as placed upon the periphery of the casing of the indicator section; but in Fig. 3, it will be observed that the binding posts are located upon the back of the casing; therefore it is evident that the location of the binding posts may be changed at will.

In operation, while the boiler is full of water, or while the water is up to the proper level in the boiler, it will maintain a like level in the outer tube 11 of the body, thereby surrounding the inner tube 12 and keeping the latter tube cool, as heat is lost by radiation. At this time the coolness of the liquid will have caused the flattened and bent tube 20, to contract inwardly and carry it away from the binding post with which it is adapted for contact; but in the event the water in the boiler should fall below a predetermined level, the steam will replace the water in the tube 11 and thereby heat the liquid in the inner tube 12. The liquid will at that time expand and expand outwardly the flattened tube 20, carrying said tube to an engagement with one of the binding posts, the binding post 30, for instance, which leads into the casing, and according to the degree of expansion of the liquid in the tube, will the said tube act upon the post carrying the hand 22, and carry said hand around to indicate a level of water slightly below normal, or greatly below the same, or "low water," or "no pressure." In the latter event, either no steam is contained in the boiler, or the apparatus is out of order. The moment that an electrical contact is made between the bent tube and the binding post 30, an alarm is sounded through the medium of the electrical circuit D and the bell located within the circuit. A small pin can be placed so as to denote "no pressure," or "out of order," or a pencil may be employed to mark a sheet or dial, both being operated by the flattened tube. The flattened tube is made of drawn brass or steel, all in one piece, and seamless.

Having thus described my invention, I claim as new and desire to secure by Letters Patent—

1. In a device of the character described, the combination, with a bent and flattened tube, of a tube connected and having communication therewith, an expansible liquid contained in the bent tube and in its connected tube, an outer or casing tube surrounding the liquid-holding tube, and having a connection affording free communication with the water space of the boiler and adapted to admit steam when the water falls to or below the level of said connection, an alarm device, and an electrical connection between the alarm device and the flattened tube, as and for the purpose specified.

2. In an indicator for boilers, the combination, with a body section comprising a tube adapted to contain an expansible liquid, a casing tube adapted to surround the liquid-containing tube, and forming an annular chamber between the two tubes, said chamber having a connection affording free communication with the water space of the boiler and adapted to admit steam when the water falls to or below the level of said connection; and a flattened and bent tube in direct communication with the interior of the liquid-holding tube, of a casing surrounding the bent tube, a dial carried by the casing, a pointer adapted to travel over the dial and connected with the bent tube, an alarm device, and an electrical connection between the alarm device and the casing, the circuit being opened or closed by the bent tube engaging with or disengaging from an insulated contact point on the casing, as and for the purpose set forth.

3. In an alarm device for boilers, the combination, with the body portion comprising a tube adapted to contain an expansible liquid, a body tube of larger diameter surrounding the liquid-containing tube, and having a connection affording free communication with the water space of the boiler and adapted to admit steam when the water level falls to or below the level of said connection and a bent tube in direct communication with the liquid containing tube, of a casing surrounding the bent tube and provided with a dial, a rotating pinion and post located within the casing, a pointer carried by the post over the dial, a rack operating the pinion, and a lever connection between the rack and one end of the bent tube, as and for the purpose set forth.

WILLIAM HENRY RODGERS.

Witnesses:
JOHN F. ROGERS,
JOHN W. CARSON.